US 8,522,235 B2

(12) United States Patent
Dobrovolskiy et al.

(10) Patent No.: US 8,522,235 B2
(45) Date of Patent: *Aug. 27, 2013

(54) PORTABLE VIRTUAL MACHINE

(75) Inventors: Nikolay N. Dobrovolskiy, Moscow (RU); Andrey A. Omelyanchuk, Moscow (RU); Alexander G. Tormasov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 110 days.

This patent is subject to a terminal disclaimer.

(21) Appl. No.: 13/339,929

(22) Filed: Dec. 29, 2011

(65) Prior Publication Data

US 2012/0311560 A1    Dec. 6, 2012

Related U.S. Application Data

(63) Continuation of application No. 11/740,936, filed on Apr. 27, 2007, now Pat. No. 8,091,084.

(60) Provisional application No. 60/746,021, filed on Apr. 28, 2006.

(51) Int. Cl.
*G06F 9/44* (2006.01)
*G06F 9/46* (2006.01)
*G06F 9/445* (2006.01)

(52) U.S. Cl.
USPC ............ 717/174; 717/126; 717/127; 718/104

(58) Field of Classification Search
USPC .................... 717/174, 126, 127; 718/104
See application file for complete search history.

(56) References Cited

U.S. PATENT DOCUMENTS

| 7,926,054 | B2 * | 4/2011 | Sonderegger et al. ............ 718/1 |
| 2002/0129270 | A1 | 9/2002 | Grieb et al. |
| 2002/0194293 | A1 * | 12/2002 | Osman .......................... 709/213 |
| 2003/0216960 | A1 | 11/2003 | Postrel |
| 2005/0198239 | A1 | 9/2005 | Hughes |
| 2005/0204013 | A1 * | 9/2005 | Raghunath et al. ........... 709/217 |

(Continued)

OTHER PUBLICATIONS

Joseph Kiniry and Daniel Zimmerman, A Hands-On Look at JAVA Mobile Agents 1997, California Institute of Technologies, Jul.-Aug. 1997.

(Continued)

*Primary Examiner* — Li B Zhen
*Assistant Examiner* — Lenin Paulino
(74) *Attorney, Agent, or Firm* — Bardmesser Law Group

(57) ABSTRACT

A system, method and computer program for launching an application into a host OS, include storing a snapshot/image of a Virtual Execution Environment (VEE) on a portable device, wherein the VEE snapshot is packed into a self-extracting file; launching the VEE from the portable device on a computer; and starting a user application within the VEE. The VEE snapshot can be restricted in its use. The VEE can be a Virtual Private Server or a Virtual Machine. The user application is a non-native application for a host OS of the computer. The VEE is launched from an icon on the portable device. The portable device can be, e.g., an iPod, a flash memory card, a digital player, a mobile phone device, a portable gaming device, rewritable CD/DVD/HD DVD/Blu Ray disk, etc. Alternatively, some data can be stored on the portable device, while other data can be downloaded from a network.

18 Claims, 4 Drawing Sheets

(56) References Cited

U.S. PATENT DOCUMENTS

| | | | |
|---|---|---|---|
| 2005/0250470 A1* | 11/2005 | Wen et al. | 455/405 |
| 2007/0067301 A1 | 3/2007 | Malik | |
| 2007/0101197 A1* | 5/2007 | Moore et al. | 714/38 |
| 2007/0234334 A1 | 10/2007 | Araujo et al. | |
| 2007/0244926 A1* | 10/2007 | Vitanov et al. | 707/104.1 |
| 2007/0245348 A1* | 10/2007 | Araujo et al. | 718/1 |

OTHER PUBLICATIONS

"XPlite and 2000lite Professional v1.0 Gold!", Jan. 9, 2004, pp. 1-7.

"Bart's Preinstalled Environment (BartPE) bootable live windows CD/DVD", May 5, 2005, pp. 1-9.

* cited by examiner

PORTABLE VIRTUAL MACHINE

CROSS-REFERENCE TO RELATED APPLICATIONS

This application is a continuation of U.S. patent application Ser. No. 11/740,936, filed on Apr. 27, 2007, entitled PORTABLE VIRTUAL MACHINE, which claims priority to U.S. Provisional Patent Application No. 60/746,021, Filed: Apr. 28, 2006, entitled PORTABLE VIRTUAL MACHINE, which is incorporated herein by reference in its entirety.

BACKGROUND OF THE INVENTION

1. Field of the Invention

This invention relates to a method, system and computer program product for implementing Virtual Machine technology as a mobile carry-along system.

2. Description of the Related Art

One of the advantages of Virtual Machine technology is the ability to isolate various user and nominal system processes from other processes running on the computer. One currently popular device is the Apple iPod, which is used to play music songs, and, more recently, video clips. iPods today are essentially plug-and-play storage devices, which can be connected to a computer running, e.g., Microsoft Windows, MacOS, or LINUX operating system. The iPod gives the user a small control wheel, with which he can select a media file for playing or browsing. This therefore presents an opportunity for the user to take the data files associated with his "work space," and take them "on the road."

Accordingly there is a need in the art for a portable virtual machine, or virtual execution environment, that a user can easily take with him wherever he goes, and which can be activated on any available computer that the user encounters.

SUMMARY OF THE INVENTION

Accordingly, the present invention is related to a system, method and computer program product for mobile Virtual Machine technology that substantially obviates one or more of the disadvantages of the related art.

In one aspect, there is provide a system, method and computer program product for launching an application into a host OS, including storing a snapshot/image of a Virtual Execution Environment (VEE) on a portable device, wherein the VEE snapshot is packed into a self-extracting file; launching the VEE from the portable device on a computer connected to the portable device; and starting a user application within the VEE. The VEE snapshot can be restricted in one of its total usage time or absolute time. The VEE is any of a Virtual Private Server, a Virtual Machine, a Hypervisor-based Virtual Machine, and a Lightweight Hypervisor-based Virtual Machine, a session of Terminal Server Windows, a session of Citrix Presentation Server, Lightweight Hypervisor-based Virtual Machines, VMM-based VMs, Hypervisor-based VM with hardware virtualization support, Hypervisor-based VM without hardware virtualization support, Hypervisor-based VM with or without security support (e.g., using Intel Lagrande technology, VM/lightweight VMM/AMD secure execution support/etc.), VPS/VE such as Virtuozzo from SWsoft, Inc., Sun container-based environments, HPUX internal container environments, jail-based environments. The user application is a non-native application for a host OS of the computer. The VEE is launched from an icon on the portable device. The portable device can be, e.g., an iPod, a flash memory card, a digital player, a mobile phone device, a portable gaming device, rewritable CD/DVD/HD DVD/Blu Ray disk and write-once CD/DVD/HD DVD/Blu Ray disk. As yet another option, the role of the portable device can be performed by remote server accessed, e.g., through the Internet.

In another aspect, there is provided a system, method and computer program product for launching an application into a host OS, including storing a snapshot of a Virtual Execution Environment (VEE) on a portable device; launching, by a simple control action, the VEE from the portable device on a computer connected to the portable device (such as a click on an icon or button); and presenting, to a user of the computer, an application within the VEE on the computer.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
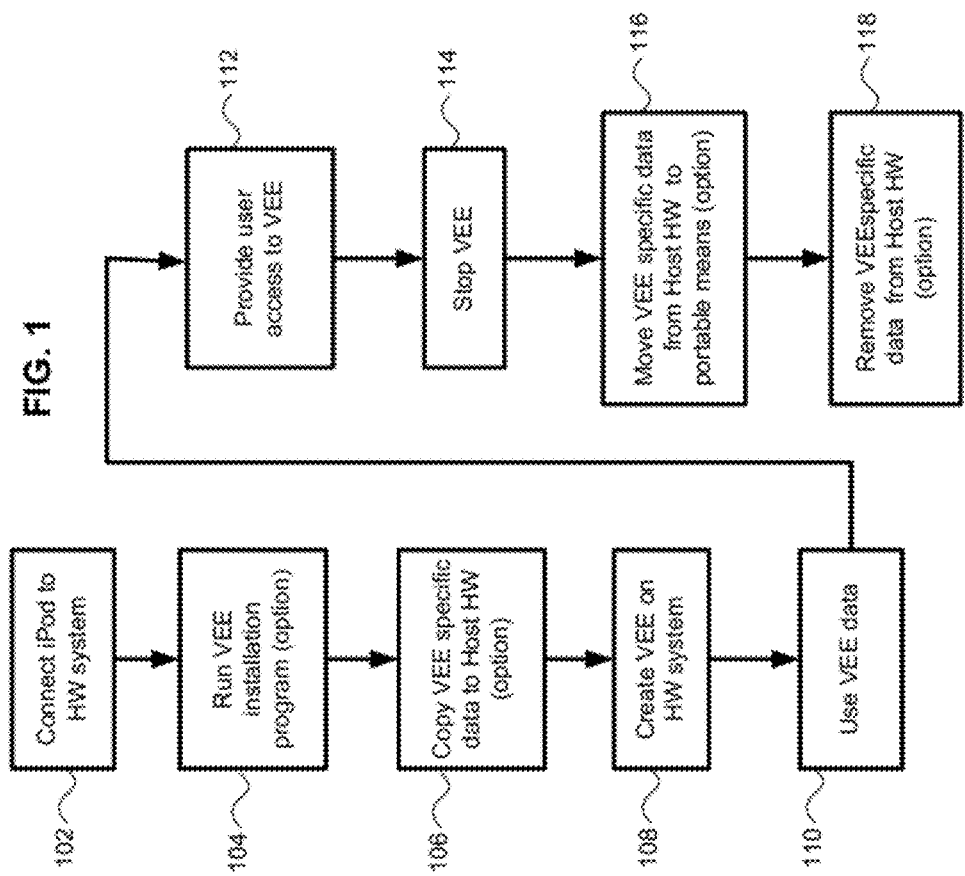
FIG. 1 illustrates an exemplary life cycle of a Virtual Execution Environment (VEE) according to one embodiment of the present invention.

Reference will now be made in detail to the preferred embodiments of the present invention, examples of which are illustrated in the accompanying drawings.

The following definitions are generally used throughout this description:

VEE—a type of environment that supports program code execution, where at least a part of the real hardware and software required for running program code are presented as their virtual analogs. From the point of view or the user, that the code in VEE runs as if it were running on the real computing system.

VPS—Virtual Private Server, is one type of a Virtual Execution Environment (VEE) running on the same hardware system with a shared OS kernel and most of the system resources, where isolation of Virtual Execution Environments is implemented on the namespace level. Software which is necessary for process execution is virtualized and provided to the process. A Virtual Private Server (VPS) is a closed set, or collection, of processes, system resources, users, groups of users, objects and data structures. Each VPS has an ID, or some other identifier, that distinguishes it from other VPSs. The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions is desirable, as if the VPS were a dedicated remote server, with the existence of the VPS being transparent from the perspective of both the VPS user and the VPS administrator.

VM—a type of an isolated Virtual Execution Environment running on the same physical machine. Each Virtual Machine instance executes its own OS kernel. Support of Virtual Machines is implemented using a Virtual Machine Monitor and/or a Hypervisor.

Hypervisor—if present, control software having the highest privilege level for administrating hardware computer resources and Virtual Machines.

Virtual storage—block-level storage space that may be regarded by the user of a computer system as addressable hardware storage, or a storage partition, using virtual addresses, that are utilized during virtual disk input/output operations as physical addresses.

Disk image—a file or a consistent set of files that represents content of a disk storage or a partition corresponding to virtual storage on a block level.

Generic file—a file or a set of files that represents storage device use of a disk image. Examples of generic files are VMware virtual disk and VPS private area. A generic file may have internal structures, for example, B+tree structures for providing update of disk image during I/O operation. One example of updating a generic file includes use of transactions. Such generic files are one way to organize information storage in the VEE of the present invention.

Virtual disk driver—an OS driver that enables other programs to interact with a virtual hardware device. The virtual disk driver may be implemented as a special driver or may be implemented by adding, to the standard hardware driver, additional functionality, for example, filtering or redirecting ability. The disk image and virtual disk driver may be used by the VEEs of the present invention as one possible implementation.

The technology described herein therefore takes advantage of such concepts and applies them to Virtual Machine technology. In essence, a Virtual Machine can be reduced to a set of files—data files, application files, drivers, etc.—that can be migrated from one physical computer to another physical computer again, applying this concept to the iPod and similar devices, the Virtual Machine can be migrated from a physical computer to an iPod—essentially, using the iPod as a storage device. Some internal support from iPod can be implemented and integrated for end user convenience (like running of some native for iPod programs directly inside the iPod), but this is not required. Furthermore, the Virtual Machine can be compressed into a single archived file, such as a zip file or a .rar file. Even further, it can be compressed into a self-extracting file—in other words, a file where, upon clicking on it or selecting it, the file unpacks itself, installs all the necessary drivers and application software (and, optionally, starts the necessary extracted application software), and is then ready for use.

Thus, a user, having the Virtual Machine on his iPod, can connect the iPod to the computer, select the Virtual Machine file, and that file will then copy itself to the computer, unpack and install itself into a Virtual Machine running on that computer. As another option, the user can start a launcher routine, which checks operating system that is installed on the computer, and installs the set of software modules required for that operating system. Typically, installation procedures do not require the computer to be rebooted, but this can be done as well. The user can then have access to all of his own files on that computer while remaining inside an isolated environment, without compromising other files or processes on that computer.

Further still, after the user is done, he can then pack the results of his work, and whatever other files have been created, deleted, or altered, back into an archive, and stored back on the iPod. As another option, the user can leave some files or work results on the computer to simplify subsequent usage of the computer for running the Virtual Machine. Thus, instead of carrying a laptop or notebook computer around, all the user needs to do is carry the iPod or a similar peripheral, and have access to his entire workspace wherever there is a computer to which he can connect the iPod—at the office, at a hotel, etc.

As another option, it is not necessary to copy the data to computer, the VM can be run directly from inside iPod (used as a storage drive) and the accessed data can be also be directly taken and written from the computer to the iPod.

Although in the discussion above, the iPod was used as an example, the invention is not limited to that particular hardware accessory. For example, a flash drive can be used as well, keeping in mind that flash drives are available today (2007) in the 2-4 gigabyte range, which is usually more than adequate for most users' purposes. Also, other external storage devices can be used. It should be remembered however that in the case of such devices as flash drives, the user may need to find the added driver, such as "drive E," on his desktop, open the drive, and then open the packed file that stores the Virtual Machine configuration and data. In the case of the iPod as an example, simply selecting the file is sufficient to begin the process of unpacking and installing the Virtual Machine. Nevertheless, some features of the iPod platform, for example, protected device ID, user ID, may offer additional advantages.

Furthermore, the same Virtual Machine can be unpacked and installed or just used from an external device onto multiple computers, if necessary. Similarly, the same Virtual Machine can be copied, or backed up to other physical media, if desired.

Further still, the Virtual Machine can be distributed in the same manner as songs and music is distributed today, using iTunes or similar software being installed on the computer for iPod administration and communication between the iPod and external sources over a network. For example, the Virtual Machine can be downloaded over the Internet to the iPod or to some other storage device. In another embodiment, the Virtual Machine corresponding to a particular iPod may be stored on a distant server and loaded to the computer using the iPod ID or user account, for example, in an online shop. The Virtual Machine therefore can be purchased in this manner, the same as with a song or a music work. Different types of Virtual Machines can be purchased—for example, a Virtual Machine directed to word processing, or a Virtual Machine directed to image processing and manipulation, or a Virtual Machine directed to technical fields, such as engineering etc.—these can all be used for a limited time or have a limited number of installation, or have other limitations. In other words, the user need only make a small payment for a finite time of use for whatever software application he requires, rather than purchase a full software package, which can cost hundreds of dollars.

An Internet connection can be controlled by a dedicated iPod control program, like iTunes, or control software can be integrated into the VM support means. An Internet connection can be used for verification of time restrictions, DRM (digital rights management), functional restrictions, or similar.

A remote iPod shop can be used for transfer of responses from user iPod to this shop, or store back images/snapshots in the local shop part as a personalized or shared data.

Here, under "snapshot," a traditional snaphot of full VM/VEE state is meant, or, just incremental backup of VM disk image, or full content of this image, or partial snapshot of VEE/VPS related processes and data state. The snapshot can be altered during image/snapshot download by the shop to personalize copy, implement restrictions, DRM and so on.

In particular, the proposed system allows users to place virtualization software, such as, e.g., provided by Parallels Software International, Inc. (either a full version, or a special more limited version) that can start without installation and system restart with all platforms—Linux/Mac/Windows, with access to the host file system, and a VM image.

For example, when a user attaches the iPod to the computer system and uses iTunes, he will receive an additional button with ability to select "VM" from a list, run it and so on (together with some optional additional administrative functions, such as backup/clone/restore/create/etc). Also, the technology described in U.S. Provisional Patent Application No. 60/745,532, filed 25-APR-2006, and incorporated herein by reference in its entirety, is applicable here as well, where the user can start an application from a VM and see their windows inside another system, such as the host desktop.

iTunes or a similar service can have a dedicated section for purchasing VM images with pre-installed applications. Thus, it is possible to sell VM images of a system with pre-installed Macintosh editors (video/audio/pictures/publishers), Windows™ Office, Microsoft Word, pre-packaged online games and so on, for a fraction of the price charged otherwise, with full or restricted ability to use them—either based on time of use, or based on utilization. Purchased applications can be installed directly over the network into a particular Virtual Machine and then the Virtual Machine may be saved, together with the installed applications that provide a starting application inside a saved Virtual Machine inside another computer. As an example, the iPod or user account ID may be used for Virtual Machine installation authorization. This can be implemented, for example, using Macintosh TPM (Trusted Platform Module) and restrictions based on Lagrande hardware (this can be "bullet-proof" system with strict restrictions and encryption, for example, for Apple Mac systems with/without Lagrande/AMD secure execution and TPM) or in software only, such as introducing a VM version with an access to iTunes site and confirmation of license times, etc.

Another way to restrict application usage is to implement such a restriction inside VMM communication modules (such as those that allow limited bandwidth/graphics resolution, etc). This allows a "time-based rate" leasing of software-in-a-box with a very small price (pay-for-real-use), and the user is not bound to a particular computer system when installing the software. The system can even be used on systems such as mobile smartphones (where VM or VEE is supported). Also, it is possible to modify each snapshot/image VM for each user (for example, by adding a serial number to the snapshot, time or other restrictions, or to bind it to particular local hardware, like TPM, or to an external web server with certificates, etc.), for example, just before or during the download procedure.

This system can be integrated with a hardware protection system, such as USB E-token keys, Sentinel Hardware keys from Rainbow systems or similar, or can be embedded into iPod hardware.

As a further embodiment, the basic image of a VM can be universalized, and instead of sale and downloads of a full VM, only a snapshot with software to standard OS-only basic VM, which is much smaller and does not require anything more in size than a typical mp3 file (roughly tens of megabytes in compressed form), and different instances of a single VM at the same time with different applications can be used.

Although in the discussion above, a Virtual Machine was used as an example, it should be remembered that Virtual Machine is only one example of such an environment. Other Virtual Execution Environments can also be used, for example, Virtual Private Servers, such as those supplied by SWsoft, Inc. Also, the present invention is not limited to any particular type of Virtual Machine—for example, conventional Virtual Machines can be used, Hypervisor-based Virtual Machines can be used, Lightweight Hypervisor-based Virtual Machines can also be used, VMM-based VMs, hypervisor-based VM with and without hardware virtualization support, with or without security support (e.g., using Intel Lagrande technology, VM/lightweight VMM/AMD secure execution support/etc.), as well as different VPS/VE such as Virtuozzo from SWsoft, Inc., Sun container-based environments, HPUX internal container environments, jail-based environments, terminal sessions of MS Windows Terminal Server and/or Citrix Presentation Server or similar.

FIG. 1 illustrates an exemplary life cycle of a snapshot of a Virtual Execution Environment, according to one embodiment of the invention. As shown in FIG. 1, in step 102, the iPod, or a similar peripheral device, such as an MP3 player or a Flash drive, is connected to a hardware system, such as a computer, a desktop, a laptop, a palmtop, and so on. In step 104, the VEE is installed on the hardware system. In step 106, data files that are specific to the VEE are then copied to the hardware system. This can typically include word processing files, databases, and/or whatever else the user is working on.

In step 108, the VEE is created on the hardware system, and in step 110, the VEE starts using the data from the snapshot. In one embodiment, to optimize performance, the data can be (at least partially) copied to the host. Alternatively, the data can be used directly from portable device. The data may be accessed from storage, such as a flash drive, an iPod or an MP3 player, or some of the data (e.g., data that is common to many users, such as OS files and libraries) to create the VEE may be accessed through a network from a remote computer or a server. In step 112, the user is provided with access to the VEE, for example, on the screen of a monitor, where a window corresponding to the VEE (such as a virtual machine running a guest operating system) is displayed inside a window.

In step 114, when the user decides that he is done on that computer, he can stop the VEE. In step 116, VEE specific data is moved from the hardware system back to the portable device, and a new snapshot that includes the new user data is created and stored on the portable device. In step 118, whatever data and information relating to the installation of the VEE can be removed from the hardware system.

As used herein, the term "snapshot" refers to a state of the Virtual Machine. The snapshot can include the VM's running state (registers' values, memory data, etc.) and/or can describe a stopped state, without running data of the VM. In the latter case, VM will be started as if after restart VM. Thus, will be appreciated that although the discussion herein is in terms of restarting or resuming a VM from a snapshot, other options are possible, such as, for example, full installation of a VM from the portable device.

Figure 2:
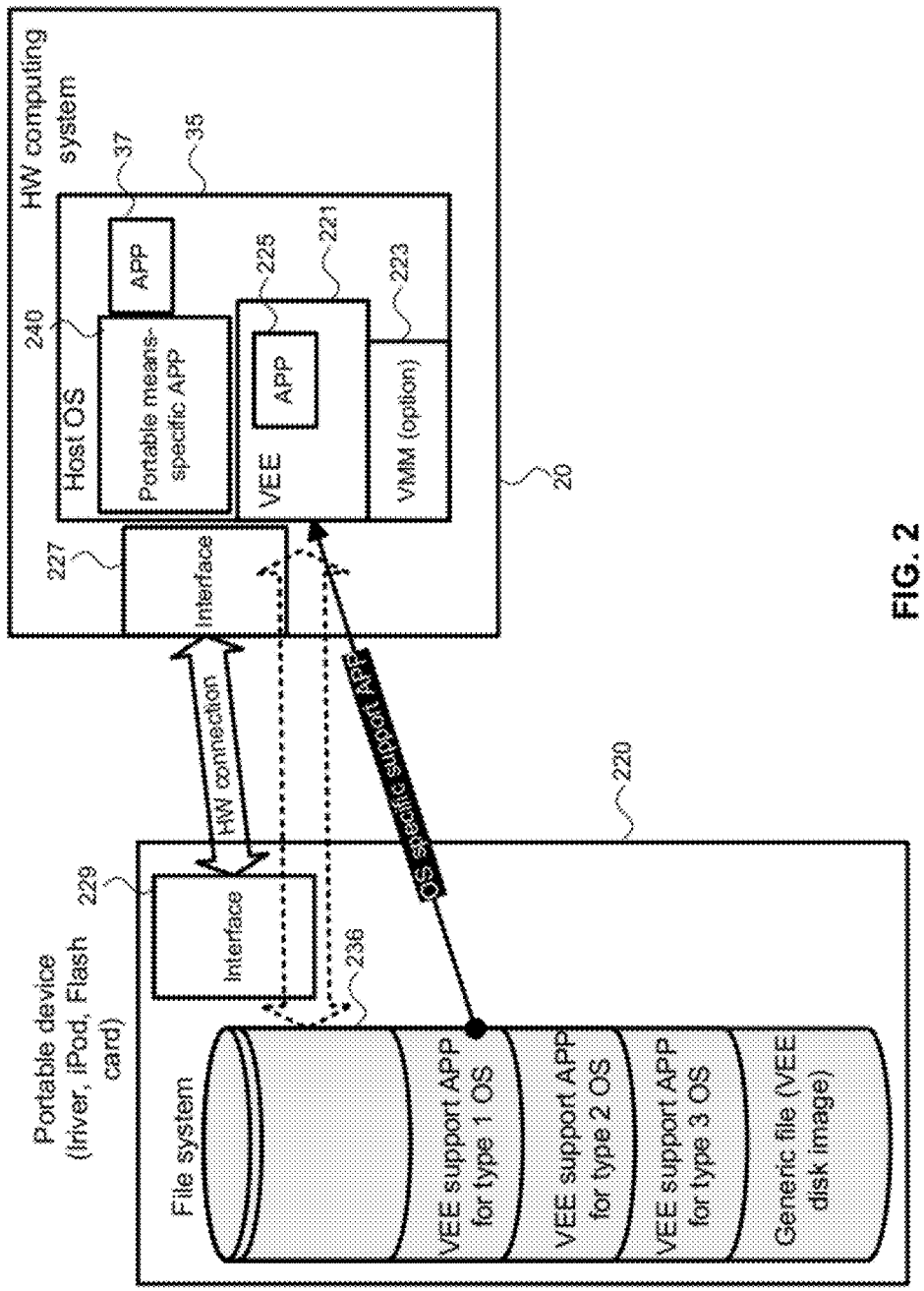
FIG. 2 illustrates an exemplary hardware configuration of one embodiment of the present invention.

FIG. 2 illustrates an exemplary hardware configuration, according to one embodiment of the invention. As shown in FIG. 2, a portable device such as an iPod, a Flash drive, and so on, 220, is connected to a hardware system 20. The hardware system 20 has a host operating system 35, already installed applications 37, and, once installation of the VEE is completed, it will have the installed VEE 221 and optionally a VMM 223. VEE-specific applications 225 will run inside the VEE. An interface 227 is used to interface to the portable device 220. The interface 227 uses a standard OS driver to support plug-and-play portable devices. The interface 227 is used to connect to the interface 229 of the portable device 220. The interface 227 includes a hardware interface between the host computer and the portable device, for logical device mounting and accessing the device mechanisms inside the host OS. An optional portable device-specific application 240 can also be used to control access to the portable device (in other words, associating a particular computer with one or more specific portable devices).

Figure 4:
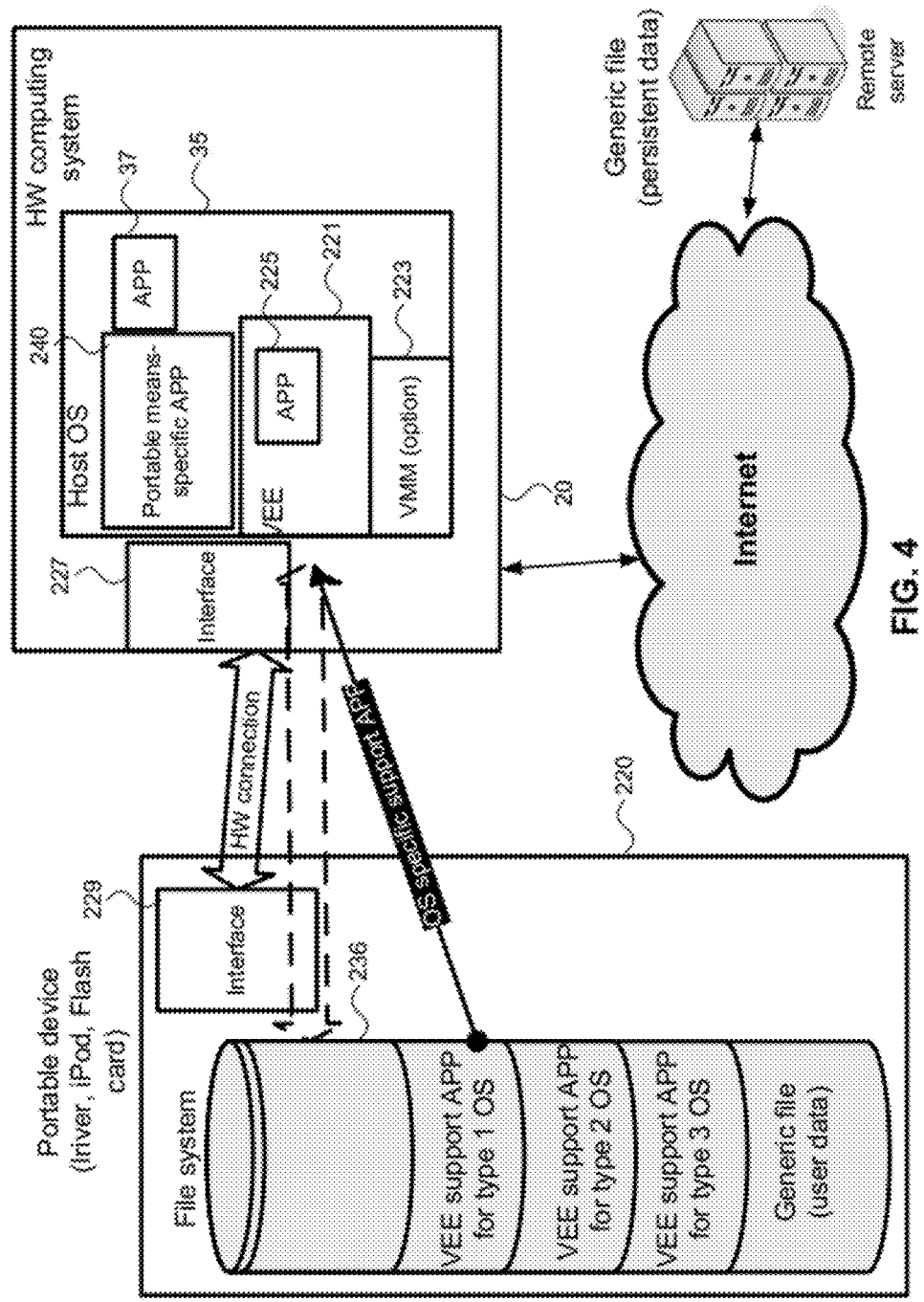
FIG. 4 illustrates an exemplary embodiment where multiple data sources (portable device and remote server) are used to install a VM.

FIG. 4 shows an example of multiply storage devices used to store VEE data. User-specific and dynamic data is stored on the portable device. Persistent data is stored on a remote server (e.g., accessible through a WAN, LAN or the Internet). In the case of a snapshot-based VEE, disk image data comes from multiple sources and includes several parts. One part is data before first snapshot. Other parts store data that has changed after first, second, etc. snapshots. From an administration point of view, the first part of virtual storage can be VEE state after guest OS installation, and the first VEE has a state of the persistent data after installation. Therefore it can be located on a remote storage. Other virtual storage data parts can be located on the portable device.

The function of portable device can also be performed by a remote storage device, e.g., a server connected to the Internet. In this case, the user does not need an external device to store VEE data, because he can store data on the remote server. For example, the user can go home, to the office, or anywhere else where he can access the remote server, opens the web page and installs and launches the VEE in a similar manner as described above.

The present invention is not limited to the number of storage device, and data can be among any number of storage devices, portable devices, remote server storage, and so on. For example, the user can have one portable device for storing VEE data and other data except secure user data, a portable device for storing secure data (e.g., cryptographic keys) and remote server storage for storing persistent data.

The portable device 220 includes a file system 236, which will interface to the file system 36 (see FIG. 3) of the hardware system 20. Also, several virtual execution environments, each optionally associated with different operating systems, are stored as part of the file system of the portable device 236. These VEEs will interface, using OS-specific support application that installs itself from the portable device, copies the VEE-specific data, creates the VEE, and uses the VEE-specific data to launch the VEE, to the hardware system 20.

As yet a further option, the portable device can be replaced by a server, such that a user can store the snapshot on a remote machine, e.g., a server, and then, at a later time (and possible when using a different physical machine), perform the installation and operation of the VEE by using the snapshot stored on the server. As yet a further option, the user-specific data can be represented by incremental snapshots or backups, such that most of the information required to launch the VEE is downloaded from a webserver, while only the user-specific data is stored on the portable device.

It will also be appreciated that in the case of a VM used as a VEE, the guest OS saved on the peripheral device and then installed on the computer system can be reduced in size by removing many of the "deadweight" files that are found in many modern OS's, such as MS Windows™ —e.g., hyberfile.sys file, some configuration files, games and accessories, temporary files, and so on. An example of a product that can perform such a function is COMPRESSOR, available from Parallels Software International, Inc.

Figure 3:
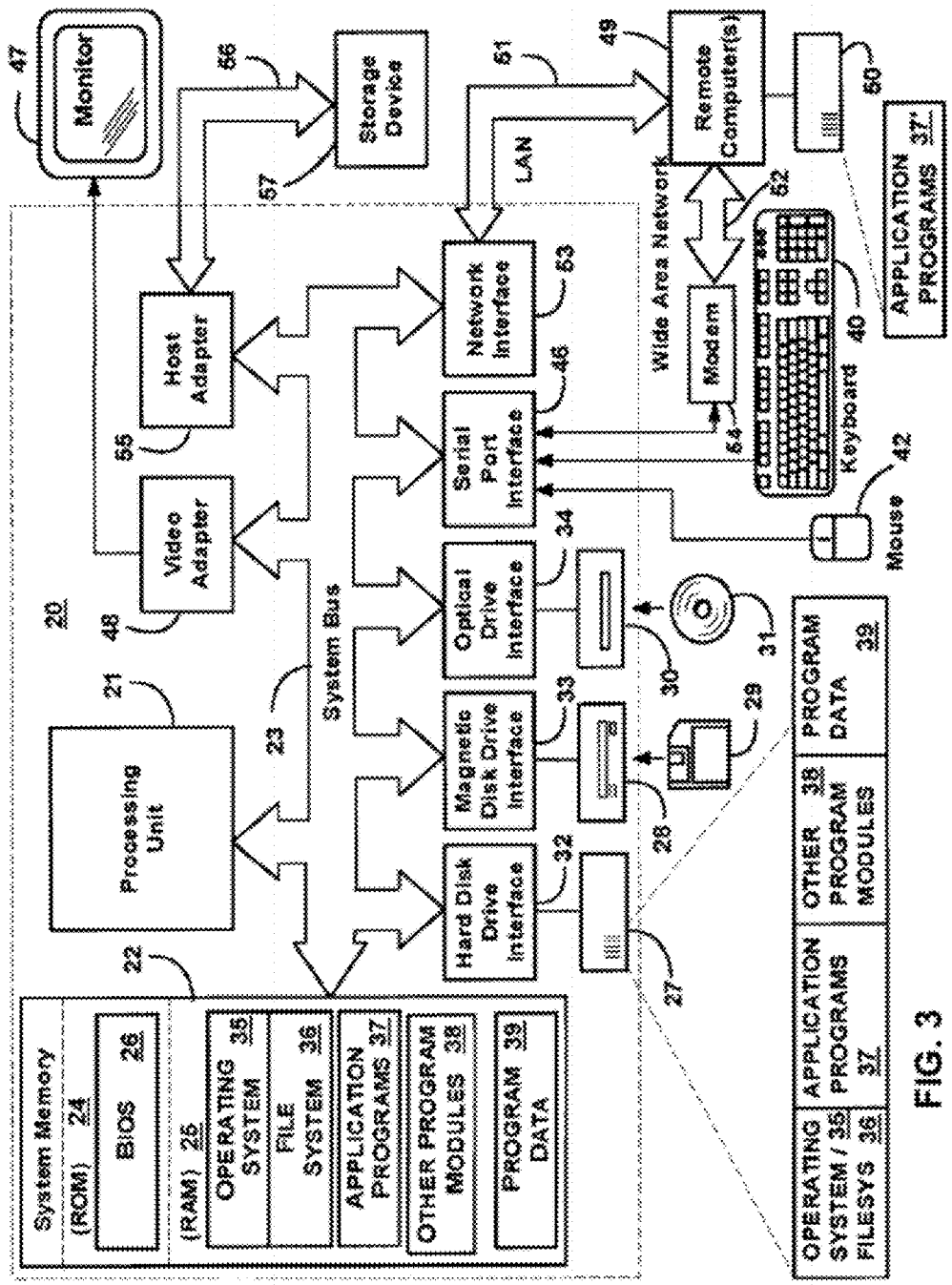
FIG. 3 illustrates an exemplary computer system on which the invention may be implemented.

With reference to FIG. 3, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for launching an application into a host OS, comprising:
    storing a snapshot of a Virtual Execution Environment (VEE) on a portable device, the snapshot including CPU registers state and memory state at a previous point in time, and tree structures representing VEE files;
    launching the VEE on a host computer from the portable device using the snapshot, such that the VEE is limited in any of (a) a number of VEE snapshot starts, and (b) total runtime of the VEE;
    launching a virtual disk driver with redirecting capability;
    binding the VEE to hardware of the host computer;
    executing a user application and generating user data in the VEE; and
    packing the VEE, including any generated user data and a current snapshot of the VEE, into an archive file and storing the archive file on the portable device.

2. The method of claim 1, wherein the VEE snapshot is restricted in absolute time of use.

3. The method of claim 1, wherein the VEE snapshot is packed into a self-extracting file.

4. The method of claim 1, wherein the VEE snapshot includes a preinstalled user application.

5. The method of claim 1, further comprising monitoring a connection of the portable device to the computer, and aborting the VEE execution when the portable device is disconnected from the computer.

6. The method of claim 1, further comprising:
    connecting the portable device to a network server;
    transmitting an ID from the portable device to the network server; and
    uploading the VEE snapshot to the portable device if the ID is associated with rights for access to the VEE snapshot.

7. The method of claim 6, further comprising a communication agent providing data transmitted between the portable device and the network server using credentials of a user account.

8. The method of claim 7, wherein the communication agent is executed either on the portable device or on the computer connected to the portable device.

9. The method of claim 1, wherein the VEE is launched using an icon on the portable device.

10. The method of claim 1, VEE is limited based on at least one of:
    a number of VEE snapshot starts; and
    an expiration time of the VEE.

11. The method of claim 1, wherein the VEE snapshot is customized for each user.

12. The method of claim 1, wherein the VEE is launched using user-specific data from the portable device and OS data installed after a download from a network.

13. The method of claim 1, wherein a support application for installing the VEE installs itself from the portable device prior to the launching and starting steps.

14. The method of claim 1, wherein the user specific data of the VEE is stored on the virtual hard disk drive on the portable device.

15. The method of claim 1, wherein the VEE is launched using OS executable files accessed from remote storage.

16. A non-transitory computer useable recording medium having computer program logic stored thereon for executing on at least one processor, the computer program logic comprising computer program code means for executing the steps of claim 1.

17. A system for launching an application into a host OS, comprising:
    a snapshot of a Virtual Execution Environment (VEE) stored on a portable device, wherein the VEE snapshot is packed into a self-extracting file, the snapshot including register values and VEE memory state at a previous point in time and tree structures representing VEE files;
    means for launching the VEE, from the snapshot stored on the portable device, on a computer connected to the portable device, such that the VEE is limited in any of (a) a number of VEE snapshot starts, and (b) total runtime of the VEE;
    means for launching a set of drivers that correspond to the host OS;
    means for launching a virtual disk driver with redirecting capability;
    means for binding the VEE to local hardware of the host computer;
    a non-native user application within the VEE;
    means for executing the user application and generating user data; and
    means for packing the VEE, including any generated user data and a current snapshot of the VEE, into an archive file and storing the archive file on the portable device.

18. A non-transitory computer useable recording medium having computer program logic stored thereon for executing on at least one processor, the computer program logic comprising computer program code means for executing the steps of:
    storing a snapshot of a Virtual Execution Environment (VEE) on a portable device, the snapshot including CPU registers state and memory state at a previous point in time, and tree structures representing VEE files;

launching the VEE on a host computer from the portable device using the snapshot, such that the VEE usage is limited by a time-based rate leasing of software-in-a-box independent of the host computer on which the VEE is launched;
launching a virtual disk driver with redirecting capability;
binding the VEE to the host computer;
executing a user application and generating user data in the VEE; and
packing the VEE, including any generated user data and a current snapshot of the VEE, into an archive file and storing the archive file on the portable device.

* * * * *